(12) United States Patent
Smith et al.

(10) Patent No.: US 10,093,408 B1
(45) Date of Patent: Oct. 9, 2018

(54) SUPERVISORY CONTROL AND MONITORING LOGIC FOR A ZONAL HYDRAULIC SYSTEM UNDER NORMAL AND EMERGENCY POWER CONDITIONS

(71) Applicant: Eaton Corporation, Cleveland, OH (US)

(72) Inventors: Joshua Aaron Smith, Ridgeland, MS (US); Jeffrey David Skinner, Jr., Madison, MS (US); Stefan Frischemeier, Madison, MS (US)

(73) Assignee: Eaton Intelligent Power Limited, Dublin (IE)

( * ) Notice: Subject to any disclaimer, the term of this patent is extended or adjusted under 35 U.S.C. 154(b) by 553 days.

(21) Appl. No.: 14/694,761

(22) Filed: Apr. 23, 2015

Related U.S. Application Data

(60) Provisional application No. 61/983,876, filed on Apr. 24, 2014, provisional application No. 62/058,771, filed on Oct. 2, 2014.

(51) Int. Cl.
*B64C 13/40* (2006.01)
*B64D 41/00* (2006.01)

(52) U.S. Cl.
CPC .............. *B64C 13/40* (2013.01); *B64D 41/00* (2013.01); *B64D 2221/00* (2013.01)

(58) Field of Classification Search
CPC ............ G05B 23/0229; G05B 23/0275; G05B 23/0272; B64F 5/60; B64D 41/00; B64D 41/007; B64D 2221/00; B64C 13/40
USPC ........... 244/58, 134 D; 290/7; 701/14, 16, 9; 340/952
See application file for complete search history.

(56) References Cited

U.S. PATENT DOCUMENTS 8,657,227 B1 * 2/2014 Bayliss ..................... H02J 4/00
244/134 D
8,774,989 B1 * 7/2014 Bush ..................... B64D 43/02
340/952

(Continued)

FOREIGN PATENT DOCUMENTS

WO WO 2015/066219 A1 5/2015

*Primary Examiner* — Nga X Nguyen
(74) *Attorney, Agent, or Firm* — Merchant & Gould P.C.

(57) ABSTRACT

A method of supplying hydraulic power via a zonal hydraulic system to an aircraft having a plurality of operating phases includes determining a current operating phase of the aircraft and setting a power limit (e.g., a pressure set point and/or flow limitation) for at least one hydraulic power unit based on the current operating phase. The hydraulic system includes a plurality of hydraulic zones. Each of the hydraulic zones includes a local controller, a hydraulic power unit controlled by the local controller, and at least one actuator powered by the hydraulic power unit. Energy savings may be realized by altering the pressure set point for and/or limiting the flow to hydraulic systems in inactive and/or less active zones. The zonal hydraulic system may be reconfigured for safety based on sensed failures and/or during emergency or alternate power conditions with limited available power. Duty cycles for multiple electric motor driven pumps of the system may be balanced. Dependency on a central hydraulic system controller may be minimized or eliminated by providing default power limit (e.g., pressure setting) reversion logic at the local controller.

13 Claims, 4 Drawing Sheets

Example zonal/distributed hydraulic system

(56) References Cited

U.S. PATENT DOCUMENTS

| | | | |
|---|---|---|---|
| 8,794,969 B2 * | 8/2014 | Tenning | G09B 25/02 434/29 |
| 2009/0118874 A1 * | 5/2009 | White | B64D 41/00 701/3 |
| 2009/0242705 A1 * | 10/2009 | Cros | F15B 13/023 244/226 |

* cited by examiner

FIGURE 1. Example zonal/distributed hydraulic system

FIGURE 2: Example flight critical hydraulic zone showing the locations of the input voltage measurement (1) and the limited voltage applied to the motor-pump(s) (2).

US 10,093,408 B1

SUPERVISORY CONTROL AND MONITORING LOGIC FOR A ZONAL HYDRAULIC SYSTEM UNDER NORMAL AND EMERGENCY POWER CONDITIONS

CROSS-REFERENCE TO RELATED APPLICATIONS

The present application claims the benefit of U.S. Provisional Patent Application Ser. No. 61/983,876, entitled SUPERVISORY CONTROL AND MONITORING LOGIC FOR A ZONAL HYDRAULIC SYSTEM, and filed on Apr. 24, 2014, and also claims the benefit of U.S. Provisional Patent Application Ser. No. 62/058,771, entitled SUPERVISORY CONTROL AND MONITORING LOGIC FOR A ZONAL HYDRAULIC SYSTEM, and filed on Oct. 2, 2014, the disclosures of which are hereby incorporated by reference in their entireties.

TECHNICAL FIELD

The present disclosure relates to control systems for hydraulic systems. More particularly, the present disclosure is directed to control systems for aircraft hydraulic systems under normal and emergency power conditions.

BACKGROUND

Hydraulic systems have been developed for use on aircraft. Such hydraulic systems typically have built-in redundancy so that failure of any one component or even failure of any one system does not lead to loss of control of the aircraft. Conventional hydraulic systems for aircraft often have multiple hydraulic systems that may operate flight control surfaces, landing gear brakes, and/or landing gear steering independently of each other. For example, in a conventional aircraft, a hydraulic A system may service flight control surfaces on a left wing, flight control surfaces on a right wing, flight control surfaces on a tail, landing gear brakes on right and left main landing gear, and/or landing gear steering at a nose landing gear of the aircraft. A hydraulic B system may service some or all of the same components as the A hydraulic system. The A hydraulic system and the B hydraulic system typically have separate hydraulic plumbing, including separate hydraulic reservoirs, to prevent any contamination that may be generated upon failure of one hydraulic system from contaminating the other hydraulic system and thereby leading to failure of the other hydraulic system from the contamination.

SUMMARY

According to certain aspects of the present disclosure, a method of supplying hydraulic power to an aircraft realizes energy savings in comparison to methods used on conventional aircraft by altering a hydraulic power limit (e.g., a pressure set point) of a hydraulic system as the hydraulic system becomes active and inactive based on a current flight phase of the aircraft. In particular, the aircraft has a plurality of operating phases (e.g., take-off, cruise, landing, etc.). The aircraft further has a plurality of hydraulic zones (e.g., a nose zone, a left wing zone, a right wing zone, a critical tail zone, and a non-critical tail zone, etc.). The hydraulic system is therefore a zonal hydraulic system and/or a distributed hydraulic system. In particular, each of the hydraulic zones has an independent hydraulic system within the hydraulic zone that includes a local controller, a hydraulic power unit, a reservoir, hydraulic plumbing, and at least one actuator powered by the hydraulic power unit. The hydraulic power unit may be electrically powered and thereby supply hydraulic pressure and flow, as needed, to the various actuators within the hydraulic zone.

A central system control and monitoring unit (e.g., a hydraulic system control and monitoring unit) may have central control over the local controllers of one or more of the hydraulic zones. The central system control and monitoring unit may determine a current operating phase of the aircraft. The current operating phase may be one of take-off, cruise, landing, and other operating phases of the aircraft. The central system control and monitoring unit may receive the current operating phase and other status information from an aircraft avionic system. The central system control and monitoring unit may further exchange system status and system health information with the aircraft avionic system. A power limit (e.g., a pressure and/or flow set point) for at least one of the hydraulic power units may be set based on the current operating phase of the aircraft. The central system control and monitoring unit may send a signal to one or more of the local controllers with the power limit information and thereby independently set the pressure set points and/or flow limitations and/or other power limitation for each of the hydraulic zones.

According to certain aspects of the present disclosure, a method of supplying hydraulic power to an aircraft includes reconfiguring an architecture of the hydraulic system based on sensed failures to provide additional levels and layers of safety for the aircraft. In particular, the local controller may determine a health status of a corresponding hydraulic zone. The hydraulic power unit may be reconfigured based on the health status. Certain of the hydraulic zones may be non-critical. In particular, a nose hydraulic zone and a tail hydraulic zone B of an aircraft may be non-critical. In such non-critical hydraulic zones, the local controller may shut down the single motor-pump or the dual motor-pumps if the health status of the corresponding hydraulic zone indicates a fault. Other hydraulic zones of the aircraft may be flight critical. Such flight critical hydraulic zones may include a left wing zone, a right wing zone, and a tail hydraulic zone A. Such flight critical hydraulic zones may have dual, triple, or other multiple motor-pump hydraulic power units, and/or hydraulic power unit(s) with more than one electric motor-driven pump. Reconfiguring the hydraulic power unit in a flight critical hydraulic zone may include shutting down a first motor-pump that produced a fault indication and reconfiguring the hydraulic zone to receive hydraulic power from the remaining motor-pump(s). The local controller may further lower a pressure set point or a flow limitation (or a combination limitation of pressure and flow) of the hydraulic power unit when reconfiguring the hydraulic zone to run on the remaining motor-pump(s).

According to certain aspects of the present disclosure, a method of supplying hydraulic power to an aircraft includes monitoring usage of a first motor-pump and a second (and possibly a third or more) motor-pump that are paired, trioed, or similarly combined together in a hydraulic power unit. The usage levels of the first motor-pump and the second (and/or third) motor-pump may be coordinated by the corresponding local controller. A first duty cycle of the first motor-pump and a second duty cycle of the second (and/or third) motor-pump may thereby be balanced and overall life of the hydraulic power unit may be extended. In certain embodiments, monitoring the usage of the first motor-pump is accomplished by tracking a first accumulated current consumption of the first motor-pump, and the monitoring of the usage of the second (and third or more, as applicable) motor-pump is accomplished by tracking a second (and third, as applicable) accumulated current consumption of the second motor-pump.

According to certain aspects of the present disclosure, a method of reconfiguring the hydraulic architecture to maximize aircraft safety during emergency power conditions includes limiting power consumption. The emergency power condition may be caused by dual engine-out failure, limited power availability from an air driven generator, and/or limited power availability from battery power. Limiting power consumption may include shutting down non-critical hydraulic zones of the aircraft if the health status of the normal electrical power supply indicates limited availability of electrical power. The limiting of power consumption of the critical hydraulic zones may include reducing a pressure set point or a flow limitation, or a combination limitation of pressure and flow of the hydraulic power unit in the critical hydraulic zones when the health status or other conditions indicate that there is limited availability of electrical power.

According to certain aspects of the present disclosure, a method of supplying hydraulic power to an aircraft is not reliant on a central control unit that controls local controllers of zonal hydraulic power units. In particular, the hydraulic system may have a central control unit that normally determines the current operating phase of the aircraft and thereby sets the power limitation (e.g., pressure set point and/or flow limitation) for one or more of the hydraulic power units based on the current operating phase of the aircraft. The power limitation instructions would normally be transmitted from the central control unit to the local controller and thereby normally set the pressure set points and/or flow limitations of the hydraulic power units. Upon failure of transmitting of the power limitation instructions from the central control unit to the local controller, the local controller reverts to a default power limitation setting (e.g. pressure set point and/or flow limitation). The failure of transmitting the power limitation may be caused by a failure of the central control unit, a failure of power to the central control unit, a failure of signal lines from the central control unit to the local control unit, and/or other causes. The local controllers may further switch from a normal electrical power supply to an emergency (or alternate) electrical power supply upon a normal supply voltage of the normal electrical power supply dropping below a predetermined value.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

According to the principles of the present disclosure, energy savings are realized by altering power limit (e.g., hydraulic pressure and/or flow) settings of a zonal/distributed hydraulic system. In particular, inactive and/or lightly used hydraulic zones of an aircraft may have a pressure set point and/or flow limitation for the inactive and/or lightly used zones reduced. In certain embodiments, inactive hydraulic zones of the aircraft may be shut down if the current flight phase will not call on hydraulic components of the inactive zone. By reducing a power limit of the inactive and/or lightly used zones, electrical power that would otherwise be spent running the inactive and/or lightly used zones may be saved. In addition, wear and tear on the inactive and/or lightly used zones may be reduced by lowering the pressure set point and/or shutting down the hydraulic zone. In addition, fuel may be saved by lowering the power limit and/or shutting down the hydraulic zones.

Usage demanded of each of the various hydraulic zones varies significantly depending on the aircraft flight phase (including phases on the ground). For example, a nose hydraulic zone may provide hydraulic power to a landing gear power control unit (i.e., PCU, hydraulic actuator, etc.) which is only active during taxi, take-off, and landing flight phases. Such nose landing gear power control units may actuate steering of the landing gear. During other flight phases, such as cruise, the nose hydraulic system zone may be shut down.

Similarly, the loading of hydraulic zones for primary and secondary flight control surfaces may vary considerably, depending on the flight phase. In order to maximize energy savings during low usage conditions, a central system controller (e.g., a hydraulic system control and monitoring unit) may lower the power limit setting for each of the hydraulic zones based on the flight phase. The power limit for each of the hydraulic zones may be set independently for that zone and may be based upon expected loads on the particular hydraulic zone during the particular flight phase. A table may be stored in the hydraulic control system that translates aircraft phase indication data from an avionic system of the aircraft into power limit settings for each hydraulic zone. The power limits included in the table are based on hydraulic loads that are expected on the power control units during each phase of the aircraft's operation.

Figure 1:
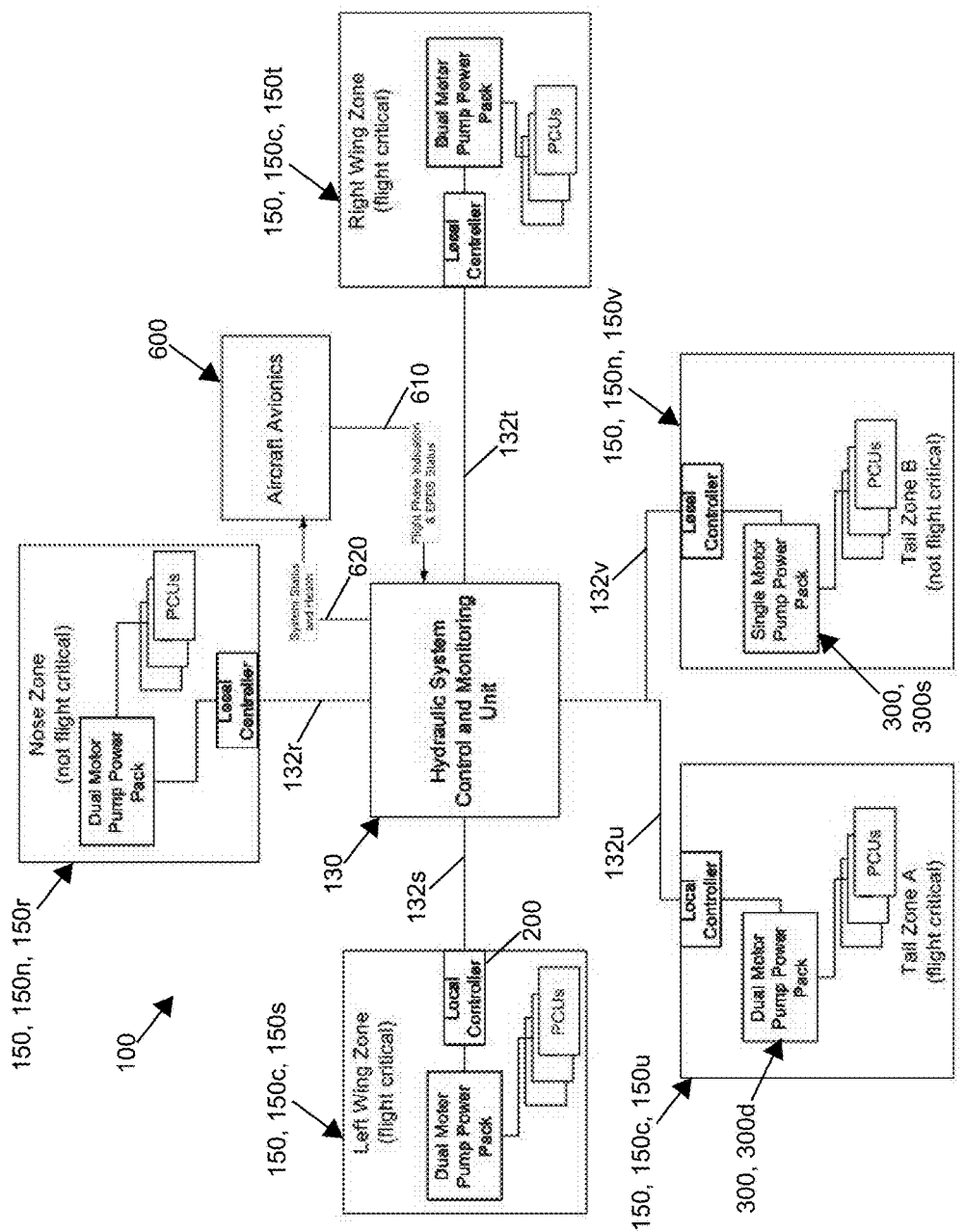
FIG. 1 is a schematic illustration of a zonal/distributed hydraulic system according to the principles of the present disclosure.

Turning now to FIG. 1, an example zonal/distributed hydraulic system 100, according to the principles of the present disclosure, is illustrated. In the example hydraulic system 100, five hydraulic zones, generically indicated by reference number 150, are illustrated. In particular, a nose hydraulic zone 150$r$, a left wing hydraulic zone 150$s$, a right wing hydraulic zone 150$t$, a tail hydraulic zone A 150$u$, and a tail hydraulic zone B 150$v$ are illustrated. Certain of the hydraulic zones 150 are flight critical and generically indicated by reference number 150$c$. In the depicted embodiment, the left wing zone 150$s$, the right wing zone 150$t$, and the tail zone A 150$u$ are flight critical hydraulic zones 150$c$. In the depicted hydraulic system 100, the nose zone 150$r$ and the tail zone B 150$v$ are non-critical hydraulic zones 150$n$.

The non-critical hydraulic zones 150$n$ may not need the same level of redundancy as the critical hydraulic zones 150$c$. The non-critical hydraulic zones 150$n$ may simply be shut down upon a shortage of electrical power developing. In contrast, the critical hydraulic zones 150c include redundancy so that a failure of a single component will not result in loss of control of the aircraft. Upon limited electrical power being available, the critical hydraulic zones 150c may ration electrical power by reducing pressure set points, hydraulic flow, the maximum motor velocity/voltage limit, and/or various other power reducing measures.

The hydraulic system 100 includes a central hydraulic control unit 130 (i.e., an example embodiment of a central system control and monitoring unit). As depicted, the central hydraulic control unit 130 is a hydraulic system control and monitoring unit. The central hydraulic control unit 130 includes a plurality of signal lines 132 to the plurality of hydraulic zones 150. As depicted, each of the hydraulic zones 150 includes a local controller 200. As depicted, the signal lines 132 extend between the central hydraulic control unit 130 and the various local controllers 200 of the various hydraulic zones 150. The signal lines 132 may carry communications in both directions between the local controllers 200 and the central hydraulic control unit 130. In particular, a signal line 132r extends between the central hydraulic control unit 130 and the local controller 200 of the nose hydraulic zone 150r. Likewise, a signal line 132s extends to a local controller 200 of the left wing zone 150s, a signal line 132u extends to a local controller 200 of the tail hydraulic zone A 150u, a signal line 132v extends to a local controller 200 of the tail hydraulic zone B 150v, and a signal line 132t extends to a local controller 200 of the right wing hydraulic zone 150t.

As illustrated, an aircraft avionic system 600 may communicate with the central hydraulic control unit 130. In particular, a flight phase signal line 610 may extend between the aircraft avionic system 600 and the central hydraulic control unit 130. In addition, a status signal line 620 may extend between the aircraft avionic system 600 and the central hydraulic control unit 130.

Figure 2:
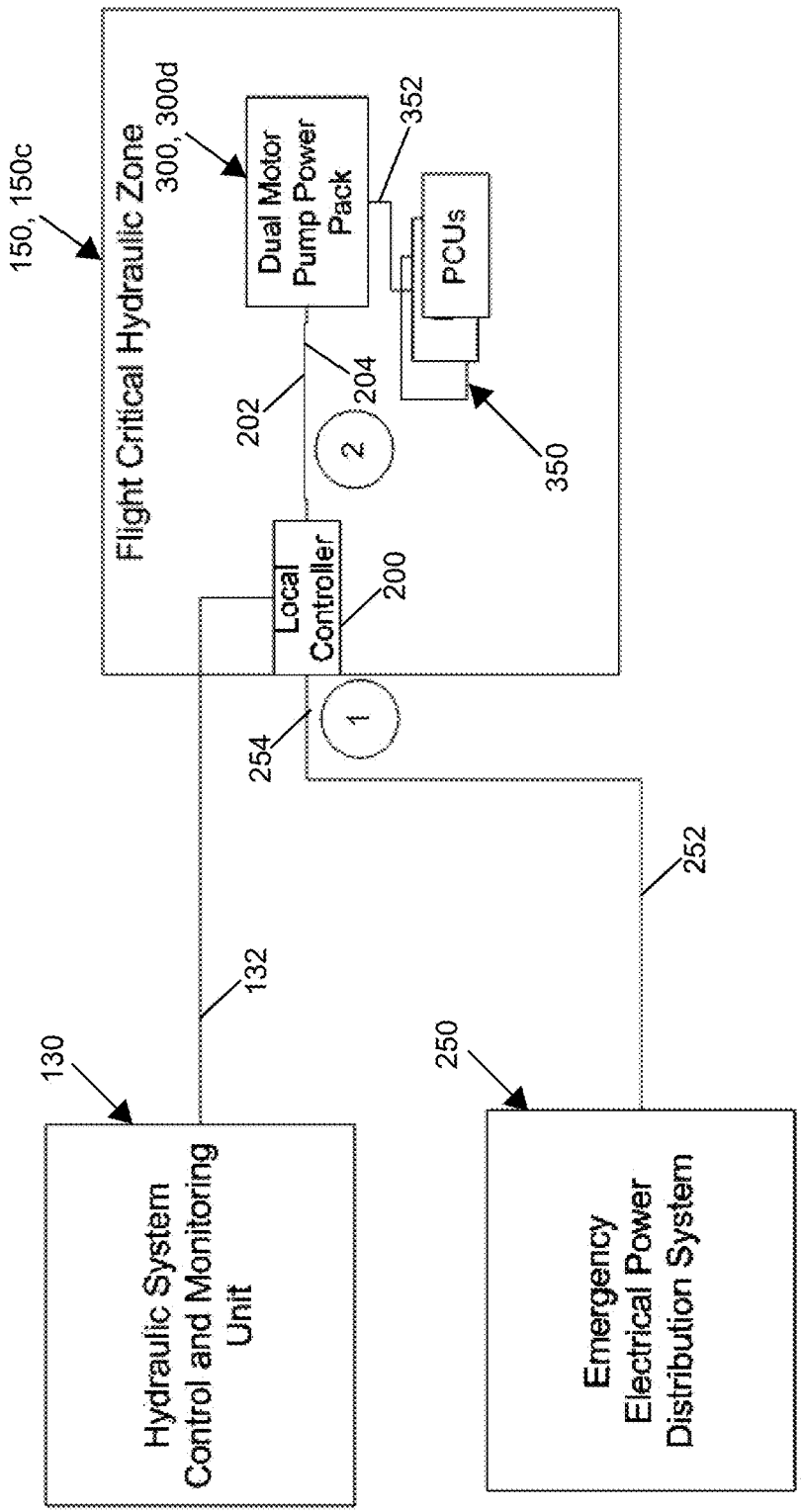
FIG. 2 is a schematic illustration of a flight critical hydraulic zone suitable for use in the zonal/distributed hydraulic system of FIG. 1.

Turning now to FIG. 2, an example hydraulic zone 150 is illustrated in detail, according to the principles of the present disclosure. As depicted, the hydraulic zone 150, 150c includes a hydraulic power unit 300. As the hydraulic zone 150, illustrated at FIG. 2, is a critical hydraulic zone 150c, a dual motor-pump hydraulic power unit 300d is used in the critical hydraulic zone 150c. The dual motor-pump hydraulic power unit 300d includes dual motor-pumps 302 for redundancy. In other embodiments, one or more of the critical hydraulic zones 150c may include a single pump-motor 302, and a respective flight control surface or other actuated component could be powered by multiple actuators 350 (i.e., power control units, PCUs, etc.). Certain actuators 350 of the multiple actuators 350 could belong to separate hydraulic zones 150c and thereby provide redundancy. In other embodiments, one or more of the critical hydraulic zones 150c may include more than two electric motor-driven pumps (EMPs) for redundancy.

One or more hydraulic lines 352 extend between the hydraulic power unit 300, 300d and actuators 350 (i.e., power control units, PCUs, etc.). The actuators 350 may be used to actuate flight control surfaces such as ailerons, rudders, flaps, etc. A signal line 202 extends between the local controller 200 and the hydraulic power unit 300, 300d. A power line 204 also extends between the local controller 200 and the hydraulic power unit 300, 300d. FIG. 2 further illustrates an emergency power supply 250 (e.g., an Electrical Power Distribution System, an EPDS, etc.) that connects to the local controller 200 via a power supply line 252. The emergency power supply 250 may be an emergency electrical power distribution system. Such emergency electrical power distribution systems may provide electrical power derived from batteries and/or air driven turbines (i.e., ram air turbines, RATs, etc.). The local controller 200 may further include a connection to a normal electrical supply system (not shown). Such normal electrical power supply systems typically derive electrical power from generators mounted on engines of the aircraft. The normal electrical power system and the emergency (or alternate) electrical power distribution systems may each include redundancy and/or other fault tolerant architectures.

Figure 3:
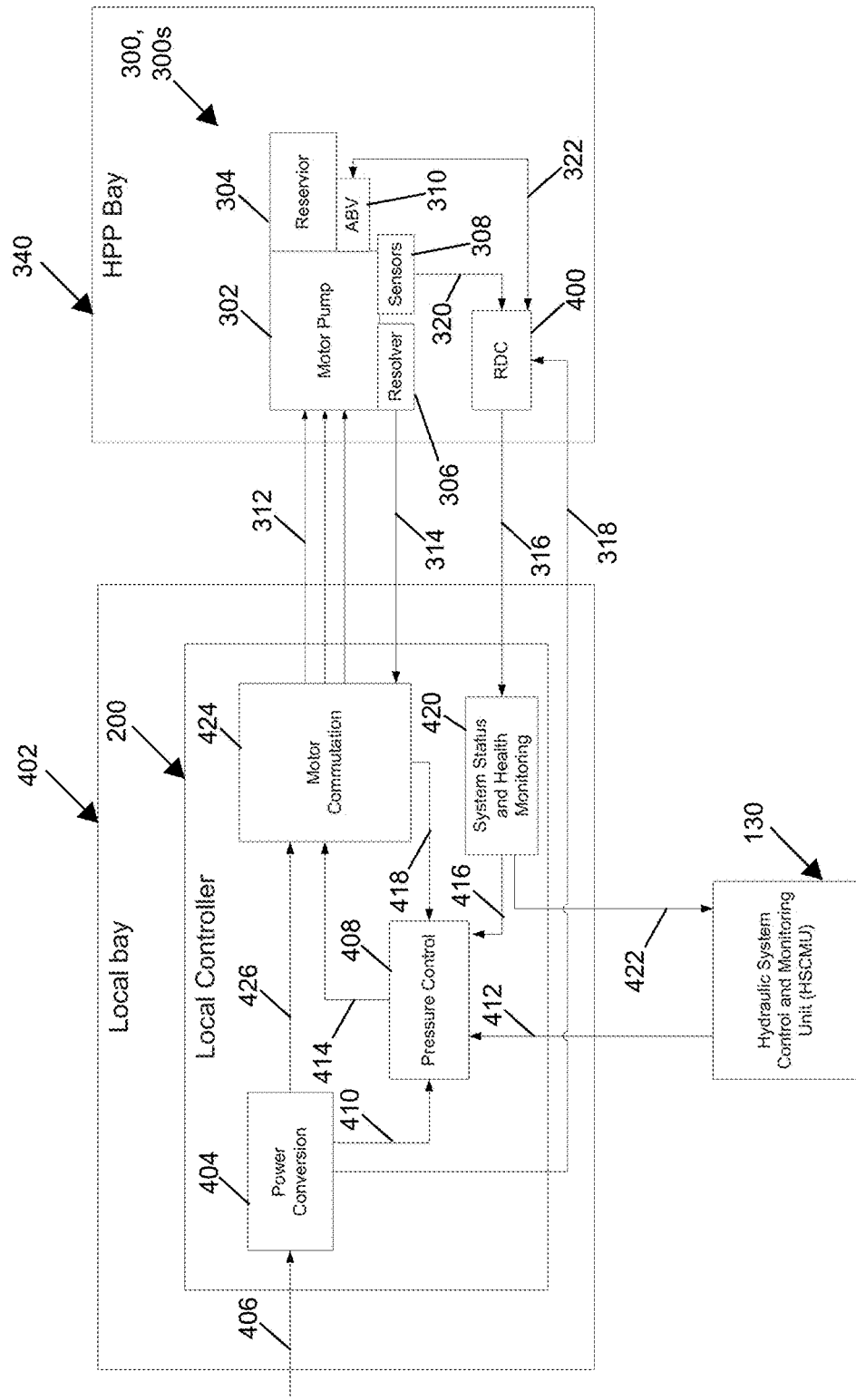
FIG. 3 is an electrical block diagram of a hydraulic power unit bay and a power electronics bay suitable for use with the zonal/distributed hydraulic system of FIG. 1.

As mentioned above, the non-critical hydraulic zones 150n may include a single motor-pump hydraulic power unit 300s rather than the dual motor-pump hydraulic power unit 300d. In other embodiments, one or more of the non-critical hydraulic zones 150n may include dual motor-pumps 302 (see hydraulic zone 150r at FIG. 1). The dual motor-pumps 302 may be provided to provide sufficient capacity. FIG. 3 illustrates a single motor-pump hydraulic power unit 300s. FIG. 3 further illustrates the hydraulic power unit 300 and the local controller 200, according to the principles of the present disclosure. As depicted, the local controller 200 may generally be arranged within a local bay 402 of the aircraft. The hydraulic power unit 300 may be generally located within a hydraulic power unit bay 340 of the aircraft.

Referring still to FIG. 3, the hydraulic power unit 300 is illustrated in detail. In particular, the hydraulic power unit 300 includes a motor-pump 302 hydraulically connected to a reservoir 304. The motor-pump 302 may be mechanically connected to a resolver 306 and/or other sensors 308 such as temperature sensors. The motor-pump 302 may be connected to an air bleed valve 310 (i.e., an ABV). The air bleed valve 310 may include an air bleed valve feedback line 322 connected to a Remote Data Concentrator (RDC) 400. The sensors 308 may be electrically connected to the Remote Data Concentrator (RDC) 400 via a sensor feedback line 320. The motor-pump 302 may receive electrical power via a set of power lines 312 from the local controller 200. The resolver 306 may send feedback to the local controller 200 via a resolver feedback line 314. The Remote Data Concentrator (RDC) 400 may send system health feedback via a health feedback line 316. The Remote Data Concentrator (RDC) 400 may receive power via a power line 318.

FIG. 3 further illustrates the local controller 200 in detail. In particular, the local controller 200 includes a power conversion module 404, a pressure control module 408, a system health module 420, and a motor commutation module 424. The local controller 200 is fed via a power input line 406. The power conversion module 404 supplies power to the Remote Data Concentrator (RDC) 400 via the power line 318, supplies power to the motor commutation module 424 via a power line 426, and supplies power to a pressure control module 408 via a power line 410. The pressure control module 408 communicates with the central hydraulic control unit 130 via a control communication line 412. The pressure control module 408 sends a control output (e.g., a voltage set point) to the motor commutation module 424 via a control output line 414. The motor commutation module 424 sends power current feedback to the pressure control module 408 via a power current feedback line 418. The system health module 420 sends the pressure control module 408 system health input via a health input feedback line 416. The system health module 420 further sends system health status via a system health status feedback line 422 to the central hydraulic control unit 130.

Figure 4:
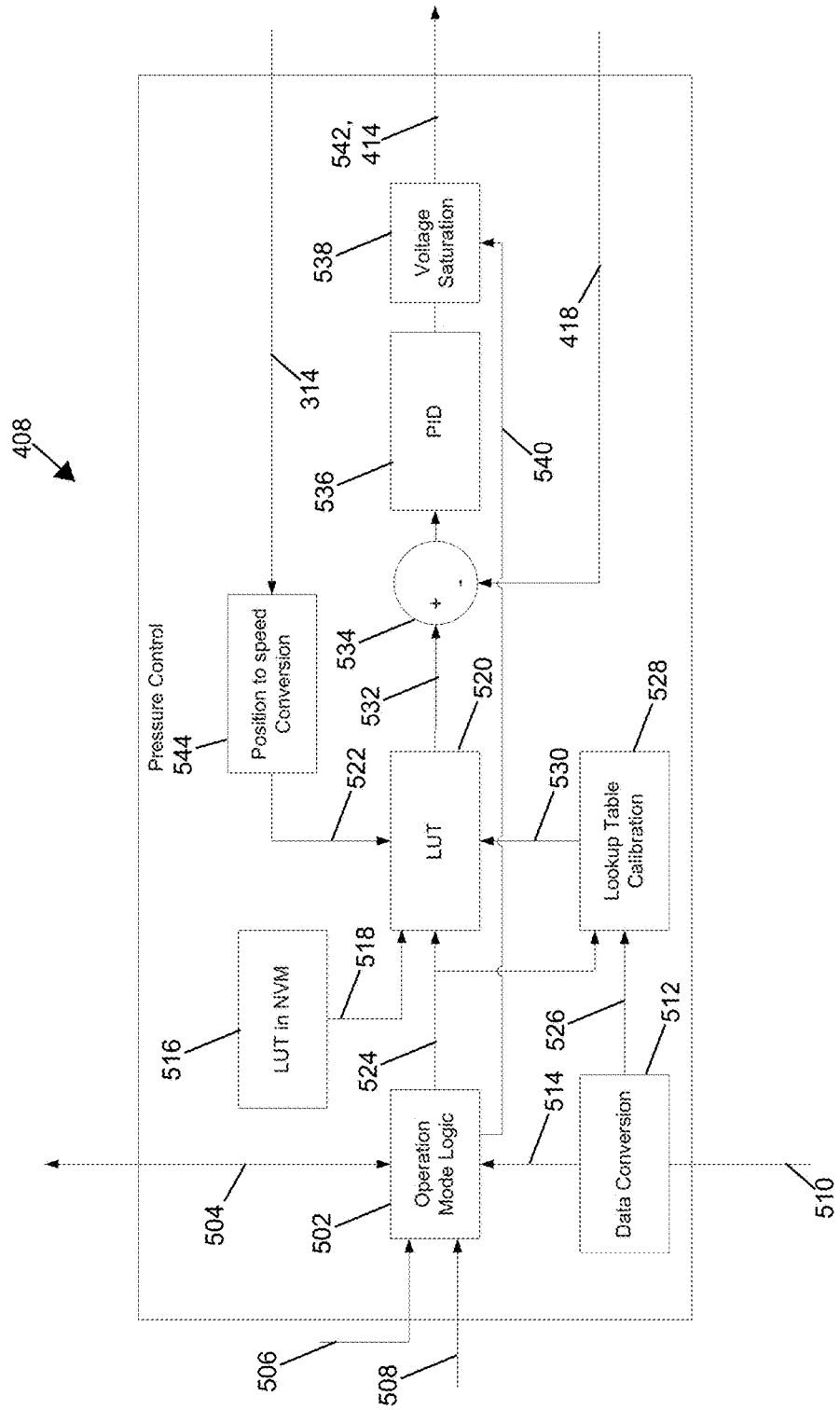
FIG. 4 is an electrical block diagram for a pressure control circuit suitable for use with power electronics of the zonal/distributed hydraulic system of FIG. 1.

Turning now to FIG. 4, the pressure control module 408 is illustrated in detail, according to the principles of the present disclosure. The pressure control module 408 may receive feedback from the resolver 306 via the resolver feedback line 314, may receive power current feedback via the power current feedback line 418, may receive and/or send communication with an opposite motor via the communication line 504, may receive system status information via the system status input line 510, may receive voltage status information via a voltage status signal line 506, and/or may receive operation mode input from the central hydraulic control unit 130 via the operation mode input line 508.

The pressure control module 408 includes an operation mode logic circuit 502. The operation mode logic circuit 502 receives the voltage status via the signal line 506, receives the operation mode via the signal line 508, receives communication from the opposite motor via the signal line 504, and receives any system fault input via a system fault input line 514. The system fault input is generated by a data conversion circuit 512 based on the system status input received via the signal line 510. The data conversion circuit 512 further sends a system status input via a system status input line 526 to a lookup table calibration circuit 528. The operation mode logic circuit 502 sends a pressure set point input via a pressure set point input line 524 to a lookup table circuit 520 (i.e., a LUT). The pressure set point input is further communicated to the lookup table calibration circuit 528. The operation mode logic circuit 502 further transmits a voltage saturation limit value via a signal line 540 to a voltage saturation module 538.

Non-volatile memory (i.e., NVM) may be used to store lookup table data. As depicted at FIG. 4, non-volatile memory 516 holds a lookup table. A data bus 518 transfers the non-volatile memory contents to the lookup table circuit 520. The lookup table circuit 520 further receives lookup table updates via a signal line 530 from the lookup table calibration circuit 528. The lookup table circuit 520 further receives speed input via a signal line 522. The speed input 522 is generated from the resolver feedback signal transmitted through the resolver feedback line 314 by a position to speed conversion circuit 544. The lookup table circuit 520 generates an electrical current set point and transmits the electrical current set point via a signal line 532 to a summation block 534. The summation block 534 is part of a proportional-integral-derivative (PID) control loop. The summation block 534 receives power current feedback via the power current feedback line 418. The results of the summation block 534 are passed through the PID circuit 536 and through the voltage saturation circuit 538 and emerge as a voltage amplitude signal transmitted by the signal line 542. The signal line 542 thereby transmits the control output 414 to the motor commutation module 424.

According to the principles of the present disclosure, the hydraulic system 100 automatically reconfigures itself upon sensing various failures. For example, if the left wing hydraulic zone 150s has a failure of one of its motor-pumps 302, the corresponding local controller 200 would switch to an operation scheme that powers the left wing zone 150s using the remaining healthy motor-pump 302. The operation scheme may result in reduced power being available to the left wing zone 150s and may further result in a failure warning being transmitted to the pilot of the aircraft. In another example, the tail hydraulic zone B produces a fault indication for the hydraulic power unit 300, 300s. In response, the local controller 200, corresponding to the tail hydraulic zone B, would switch off the motor-pump 302 of the corresponding hydraulic power unit 300s. By switching off the motor-pumps 302 with fault indications, the hydraulic system 100 minimizes further system damage and minimizes power consumption.

According to the principles of the present disclosure, the hydraulic system 100 balances a duty cycle for the hydraulic power units 300d that includes multiple motor-pumps 302. In particular, a duty cycle for each of the motor-pumps 302 can be balanced over a life of the aircraft and/or a life of the hydraulic power unit 300d. The life of the hydraulic power unit 300 may thereby be maximized. The local controller 200 may be configured to monitor the duty cycle of each motor-pump 302. The duty cycle may be tracked by measuring and recording an accumulated current consumption of each of the motor-pumps 302 over time. Based on this data, the local controller 200 may rotate usage levels between each of the motor-pumps 302 to maintain balanced duty cycles.

According to the principles of the present disclosure, the hydraulic system 100 reconfigures itself for maximum aircraft safety during emergency power conditions. Such emergency power conditions may occur when both engines of a two engine aircraft are simultaneously shut down while the aircraft is in flight. Such emergency power conditions may be further compounded by limited power from an air driven generator and/or limited power from a battery system.

Under certain failure conditions of the aircraft electrical power distribution system, the hydraulic system 100 may be required to share a limited emergency electrical power source with other electrical consumers. To maximize aircraft safety during such emergency power conditions, the hydraulic system 100 is adapted to limit the power consumed by the hydraulic system 100. Upon the aircraft experiencing an emergency power condition, the non-critical hydraulic zones 150n are shut down to limit power consumption. For example, as illustrated at FIG. 1, only the left wing zone 150s, the right wing zone 150t, and the tail zone A 150u are provided power during the emergency power condition. The nose hydraulic zone 150r and the tail hydraulic zone B 150v may be shut off to conserve electrical power.

In particular, according to the principles of the present disclosure, the central hydraulic control unit 130 receives a power distribution system status from the aircraft avionic system 600 via the signal line 620. During emergency conditions, the central hydraulic control unit 130 sends a signal to the local controllers 200 to either shut down (for non-critical hydraulic zones 150n) or to switch to an emergency power mode (for critical hydraulic zones 150c). The hydraulic system 100 further limits the power consumption of the critical hydraulic zones 150c. In particular, in the emergency power mode, the local controllers 200 will limit power consumption by limiting the voltage applied to the pump-motors 302. As the power available from the emergency electrical power system may vary depending on factors such as aircraft altitude, aircraft speed, and other electrical power loads, the power limitations commanded by the local controllers 200 may vary. The variation in the available electrical power can be detected and/or estimated by measuring a voltage input from the power distribution system to the local controllers (see location 254 at FIG. 2). When a reduction in the voltage at position 254 is sensed, the local controllers 200 will reduce the limit on the voltage applied in the power line 204 to the pump-motors 302. By limiting the voltage and power transferred to the hydraulic power unit 300, 300d, the supply voltage of the power distribution system at location 254, for example, may be maintained above a minimum safe operating voltage.

According to the principles of the present disclosure, the hydraulic system 100 is fault tolerant of a failure of the central hydraulic control unit 130. In particular, a default pressure setting reversion logic is included in the local controllers 200. In this way, a loss of the central hydraulic control unit 130 avoids the loss of the hydraulic system 100. In addition, most or all of the system operation logic of the hydraulic zones 150 is accomplished in the local controllers 200. In the event that no signal is received from the central hydraulic control unit 130, the affected local controllers 200 will automatically revert to a default pressure setting. In the event that the input voltage at the location 254 also drops, the local controllers 200 are equipped with logic to switch to an emergency power mode and receive electrical power from the emergency power supply 250.

TABLE 1

Example HSCMU Inputs and Outputs

| Inputs | Transmitting System | Outputs | Receiving System |
|---|---|---|---|
| Flight Phase | Aircraft Avionics | Pressure Set Points | Power Electronics |
| Hydraulic System Status and Health Monitoring | Power Electronics Modules | EPDS Status | Power Electronics |
| Electrical Power Distribution System Status | Aircraft Avionics | Hydraulic System Status | Aircraft Avionics |
| | | Health Monitoring | Maintenance System |

Turning now to FIG. 3 and Table 1, an example list of inputs and outputs to the central hydraulic control unit 130 are described in detail. In particular, the central hydraulic control unit 130 receives flight phase information as well as a status of the electrical power distribution system from the aircraft avionic system 600. The central hydraulic control unit 130 translates the flight phase information into pressure settings for the hydraulic power units 300. Emergency situations may override these pressure settings.

The central hydraulic control unit 130 receives status and health monitoring data from the local controller 200 and transmits these signals to the aircraft avionic and maintenance systems. Status data may include the pressure, the temperature, and power draw of each hydraulic power unit 300. Health monitoring data includes replacement warnings for each line replaceable unit (LRU). The central hydraulic control unit 130 may be equipped with logic to translate the aircraft flight phase information from the aircraft avionic system 600 into a desired power limit setting (e.g., pressure set point(s), flow limits(s), etc.) for each of the hydraulic power units 300.

TABLE 2

Example System Pressure versus Flight Phase (Normal Operation of EPDS)

| Flight Phase | Wing Zone System Pressure (psi) | Nose Zone System Pressure (psi) | Tail Zone System Pressure (psi) |
|---|---|---|---|
| Taxi Out | 1500 | 3000 | 2000 |
| Take Off | 3000 | 3000 | 3000 |
| Climb | 3000 | 0 | 3000 |
| Cruise | 1500 | 0 | 2000 |
| Descent | 3000 | 3000 | 3000 |
| Taxi In | 1500 | 3000 | 2000 |

Table 2 shows the pressure set points for each system in a normal operation mode of the electrical power distribution system. Upon the pressure set points being defined, the central hydraulic control unit 130 transmits the corresponding set point to each local controller 200. The central hydraulic control unit 130 provides the electrical power distribution system status to the local controller 200.

TABLE 3

Example Enable/Disable Command Based on EPDS Status

| EPDS Status | Non-essential PE Modules | Essential PE modules |
|---|---|---|
| Normal | ON | ON |
| Transition to Emergency Power (Battery Bus) | No Signal | Emergency Mode |
| Emergency Power (ADG/APU/Batt) | No Signal | Emergency Mode |

Table 3 defines the signals given during each of the electrical power distribution system operation modes. During a transition to emergency power and/or emergency power operation, the central hydraulic control unit 130 does not communicate with the non-critical hydraulic zones 150n as no power is applied to the local controller 200 of these hydraulic zones 150n. Power draw is thereby minimized. The Remote Data Concentrator (RDC) 400 may convert sensor data of the hydraulic power unit 300 and may transmit this data to the local controller 200. A list of inputs and outputs for the Remote Data Concentrator (RDC) 400 is given at Table 4.

TABLE 4

Example LCMU Inputs and Outputs

| Inputs | Outputs |
|---|---|
| Reservoir Level | ARINC data signal to PE |
| Temperature (Reservoir) | |
| Temperature (Pump A) | |
| Temperature (Pump B) | |
| Pressure (HPP Outlet) | |
| Differential Pressure Switch (Pressure Filter) | |
| Differential Pressure Switch (Return Filter) | |
| Auto Bleed Valve Status | |

The local controller 200 is responsible for controlling the motor-pump 302 to maintain the hydraulic power unit 300 at the pressure set point defined by the central hydraulic control unit 130. A list of the inputs and outputs for the local controller 200 is given at Table 5.

TABLE 5

Example PE Inputs and Outputs

| Inputs | Transmitting System | Outputs | Receiving System |
|---|---|---|---|
| System Pressure Set Point | HSCMU | n-Phase Sinusoidal Motor Power (n >= 3) | PM Motor |
| Operation Mode (On Emergency Mode) | HSCMU | System Status | HSCMU |
| 230 VAC or 28 VDC power | Aircraft AC or DC power bus | System Health | HSCMU |
| Sensor Data | LCMU | | |
| Motor Position | Resolver | | |

Under normal operation, the local controller 200 converts an AC voltage power input from the aircraft to a DC power for the motor controllers and a low voltage DC power for the central hydraulic control unit 130 and the sensors 308. In transition to emergency power, the essential hydraulic zones 150c may receive power from an inverter that converts DC power from a battery bus to a high voltage DC power for the motor controllers.

The motor commutation circuit 424 in the local controller 200 drives the motor of the motor-pump 302 and delivers sinusoidal electrical power to multiple motor phases. The voltage amplitude 414 for the sinusoidal motor power is an output from the pressure control module 408. The motor commutation module 424 further bases its output on the motor shaft position feedback received from a shaft mounted resolver 306.

In normal operation mode, the pressure control module 408 maintains system pressure at the pressure set point defined by the central hydraulic control unit 130. The system flow demand may be unknown and varying. The system pressure control is accomplished by varying the speed (i.e., the applied voltage) of a fixed displacement motor-pump 302. For example, if the flow demands increase (i.e., servo valve opens up), then the pressure will drop, indicating that the motor speed (i.e., the motor voltage) should be increased.

Turning now to FIG. 4, the electrical block diagram of the pressure control circuit is illustrated. In an emergency mode, the pressure set point can be overridden by a speed/voltage limiting value based on the available power from the air driven generator.

The desired pressure set point is determined in the operation mode logic circuit 502 using the inputs of the central hydraulic control unit 130 operating mode, system status and health status, and/or the operation mode of the adjoining motor-pump 302. Dual hydraulic power units 300d include a communication line 504 that transmits (e.g., via a cross-channel data link). During low flow conditions, one of the motor-pumps 302 may be in a standby mode and the other may be in an active mode. During high flow conditions, both of the motor pumps 302 may operate in an active mode and share the flow demand with each other.

Motor current may be used as an approximation of the system pressure for feedback control. This method may be used to avoid depending upon the system pressure transducer. The current is measured in the commutation circuit 424. For a given pressure set point, a lookup table is used to define the corresponding current set point as a function of speed of the motor of the motor-pump 302, as determined from feedback from the resolver 306. The lookup table that is used for control depends on indication error, pressure, and/or temperature. In particular, if the system status and health monitoring circuit determines that there is excessive error in the pressure signal, then the local controller 200 may revert to the lookup table in non-volatile memory 516. If the measured steady state pressure is significantly different from the pressure set point, then the lookup table calibration circuit may send an updated lookup table for use in control of the motor. The relationship between current and pressure can change significantly with system temperature. Therefore, there may be multiple lookup tables stored in non-volatile memory for different temperature ranges. For significant temperature changes, the lookup table can be updated.

A proportional-integral-derivative (PID) control algorithm may operate on the error between the current set point (defined by the lookup table) and the measured current. The output of the PID algorithm may be a voltage amplitude signal for use in the motor commutation circuit.

The systems status and health monitoring circuit transmits the systems status and health to the central hydraulic control unit 130 and the pressure control circuit 408. System status and health is determined based on sensor data received from the local controller 200.

U.S. provisional patent application Ser. 61/896,683, filed on Oct. 29, 2013, and PCT application No. PCT/US2014/62973, filed on Oct. 29, 2014, and titled Electronic Control for a Rotary Fluid Device, disclose certain aspects of incorporating a look-up-table to achieve a pressure set point, operating and controlling a hydraulic power unit with dual (i.e., multiple) motor-pumps, and incorporating health monitoring logic. U.S. provisional patent application Ser. 61/896,683 and PCT application No. PCT/US2014/62973 are hereby incorporated by reference in their entireties, and various features disclosed therein may be incorporated into the zonal/distributed hydraulic system 100, the central hydraulic control unit 130, the hydraulic zones 150, the local controllers 200, the hydraulic power units 300, the pressure control modules 408, and/or the system health module 420.

Referring again to FIG. 1, other embodiments are disclosed. In an embodiment, maximum power available under emergency power conditions is used without stalling or damaging the emergency power supply. Coordination between essential hydraulic power units 300 is required in order to achieve maximum power usage without overdrawing. The power available to each hydraulic power unit 300 is dependent on the usage level of other hydraulic power units 300. If power is limited independently, a more conservative power limiting approach may be used to account for worst case simultaneous loads. The disclosed embodiment uses central hydraulic control unit 130 to coordinate between hydraulic power units 300 so that the system can use all of the available power. For example, in a situation where the left wing hydraulic zone 150s and the right wing zone 150t have a low flow demand while tail hydraulic zone A 150u has a high flow demand, central hydraulic control unit 130 can read in the flow demand of each zone and adjust the pressure and/or flow setting in each zone to achieve the maximum performance for individual consumer groups without exceeding the limitations of the emergency power supply overall.

In another embodiment, the hydraulics system 100 is configured to achieve safety targets in emergency mode through reconfigurability. To achieve adequate safety targets in emergency mode, back-up control logic is programmed into the local controllers. In the event of a failure of the centralized control path, the local controllers 200 will revert to a more conservative independent control strategy.

In still another embodiment, the hydraulics system 100 is configured to avoid power control unit 350 control loop errors due to extremely low pressures or flow rates. In the event of simultaneous high loads on multiple hydraulic power units 300, there may not be sufficient power available to maintain the system pressure set points or to supply sufficient flow within the acceptable range expected by the consumer system controller(s). This may lead to problems with the power control unit 350 control loop. The power control unit 350 control configuration is adjusted during emergency power operation. In an embodiment, the control loop is adjusted by relaxing the maximum accepted lag of the affected power control units (e.g., position, speed, etc.) compared to a commanded value (e.g., position and/or speed command).

In certain embodiments, the central hydraulic control unit 130 (i.e., the Hydraulic System Control and Monitoring Unit, HSCMU, the master hydraulic controller, the supervisory controller, etc.) may be integrated with other control units, controllers, computers, avionics computers, multi-purpose computers, multi-purpose controllers, etc. of the aircraft. In certain embodiments, a multi-purpose hardware component may be reprogrammed and thereby serve in multiple capacities within the aircraft hydraulic system (e.g., the hydraulic system 100). For example, various local controllers 200, the central hydraulic control unit 130, controllers/computers within the aircraft avionic system 600, etc. may be implemented with a multi-purpose hardware component. In certain embodiments, certain of the various logic routines of the present disclosure may be executed centrally (e.g., in the central hydraulic control unit 130). In other embodiments, certain of the various logic routines of the present disclosure may be executed over a distributed network of computers/controllers (e.g., in a plurality of the local controllers 200).

In certain embodiments, the hydraulic system architecture, according to the principles of the present disclosure, may allow for smaller hydraulic and/or electrical power supplies. The benefits of the hydraulic system architecture (e.g., the hydraulic system 100) may thereby include improved fuel efficiency, lower weight of the overall hydraulic and/or electrical systems, reduced sized, more compact integration into the aircraft, etc.

In certain embodiments, the pressure set point may be lowered uniformly in such a way as to mimic the function of a single motor pump connected to multiple consumers (e.g. connected hydraulically instead of electronically). The pressure set point may be determined based on the instantaneous flow demand of each consumer.

According to the principles of the present disclosure, various power limits are set based on the current operating phase of the aircraft, power saving constraints, emergency operating constraints, available power constraints, etc. Implementing the power limits may be accomplished by setting various pressure set points, hydraulic flow limits, motor speed limits, motor torque limits, component power limits, voltage limits, current limits, etc. Implementing the power limits may be accomplished by combining one or more of the above limits. Implementing the power limits may be done for aircraft emergency reasons, for power conservation reasons, for power rationing reasons, for noise reduction reasons, for extending component life, and for other reasons.

In certain embodiments, Hydraulic Power Packs (i.e., HPPs, hydraulic power units 300, etc.) may include one, two, three, or more electrically driven pumps.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A method of supplying hydraulic power to an aircraft, the aircraft having a plurality of hydraulic zones, each of the hydraulic zones including a local controller, a hydraulic power unit controlled by the local controller, and at least one actuator powered by the hydraulic power unit, the aircraft being operable in a plurality of operating phases, the method comprising:
    determining a current operating phase of the plurality of operating phases of the aircraft; and
    independently setting a power limit for at least one of the plurality of hydraulic zones based on the current operating phase of the aircraft,
    wherein the determining of the current operating phase of the aircraft includes receiving operating phase indication data from an avionic system of the aircraft, and
    wherein a control unit processes the operating phase indication data and sends power limit instructions to at least one of the local controllers of the plurality of hydraulic zones to set the power limit of at least one of the hydraulic power units.

2. The method of claim 1, wherein the power limit is determined at least in part by a pressure set point.

3. The method of claim 1, wherein the power limit is determined at least in part by a hydraulic flow limit.

4. The method of claim 1, wherein at least one of the hydraulic power units includes a single motor-pump.

5. The method of claim 1, wherein at least one of the hydraulic power units includes a first motor-pump and a second motor-pump.

6. The method of claim 1, wherein at least one of the hydraulic power units includes more than two motor-pumps.

7. The method of claim 1, wherein at least one consumer of at least one of the plurality of hydraulic zones is a single actuator and wherein the hydraulic power unit of the at least one of the plurality of hydraulic zones is dedicated to the single actuator.

8. The method of claim 1, wherein at least one consumer group of at least one of the plurality of hydraulic zones is a plurality of actuators and wherein the hydraulic power unit of the at least one of the plurality of hydraulic zones is shared among the plurality of actuators.

9. The method of claim 1, wherein processing of the operating phase indication data by the control unit includes translating the operating phase indication data into the power limit instructions via a look-up table.

10. The method of claim 1, further comprising conserving energy of the aircraft by lowering the power limit of at least one of the hydraulic power units when a corresponding one of the plurality of hydraulic zones is inactive in the current operating phase of the aircraft.

11. The method of claim 1, further comprising conserving energy of the aircraft by lowering the power limit of at least one of the hydraulic power units when a corresponding one of the plurality of hydraulic zones has lower expected loading in the current operating phase of the aircraft.

12. The method of claim 1, further comprising conserving energy of the aircraft by shutting down at least one of the hydraulic power units to reduce to zero the pressure set point of the at least one of the hydraulic power units when a corresponding one of the plurality of hydraulic zones is inactive in the current operating phase of the aircraft.

13. A method of supplying hydraulic power to an aircraft, the aircraft having a plurality of hydraulic zones, each of the hydraulic zones including a local controller, a hydraulic power unit controlled by the local controller, and at least one actuator powered by the hydraulic power unit, the aircraft being operable in a plurality of operating phases, the method comprising:

determining a current operating phase of the plurality of operating phases of the aircraft; and independently setting a power limit for at least one of the plurality of hydraulic zones based on the current operating phase of the aircraft, wherein the determining of the current operating phase of the aircraft includes receiving operating phase indication data from an avionic system of the aircraft, and wherein a central control unit processes the operating phase indication data and sends power limit instructions to at least one of the local controllers of the plurality of hydraulic zones to set the power limit of at least one of the hydraulic power units.

\* \* \* \* \*